United States Patent
Kammans

(10) Patent No.: US 12,092,813 B2
(45) Date of Patent: Sep. 17, 2024

(54) DIGITAL VIEWING DEVICE

(71) Applicant: Leica Camera Aktiengesellschaft, Wetzlar (DE)

(72) Inventor: Sigrun Kammans, Herborn (DE)

(73) Assignee: Leica Camera Aktiengesellschaft, Wetzlar (DE)

( * ) Notice: Subject to any disclaimer, the term of this patent is extended or adjusted under 35 U.S.C. 154(b) by 42 days.

(21) Appl. No.: 17/798,255

(22) PCT Filed: Feb. 13, 2020

(86) PCT No.: PCT/DE2020/100103
§ 371 (c)(1),
(2) Date: Aug. 8, 2022

(87) PCT Pub. No.: WO2021/160195
PCT Pub. Date: Aug. 19, 2021

(65) Prior Publication Data
US 2023/0076002 A1    Mar. 9, 2023

(51) Int. Cl.
*G02B 27/00* (2006.01)
*G02B 23/12* (2006.01)

(52) U.S. Cl.
CPC ......... *G02B 27/0025* (2013.01); *G02B 23/12* (2013.01)

(58) Field of Classification Search
CPC ........ H04N 23/53; H04N 23/68; H04N 23/69; H04N 23/695; G02B 27/0025; G02B 27/0068; G02B 23/12
See application file for complete search history.

(56) References Cited

U.S. PATENT DOCUMENTS

| | | |
|---|---|---|
| 2006/0017813 A1 | 1/2006 | Okubo et al. |
| 2009/0179824 A1 | 7/2009 | Tsujimoto et al. |
| 2009/0315808 A1 | 12/2009 | Ishii |
| 2010/0033604 A1 | 2/2010 | Solomon |
| 2010/0103284 A1* | 4/2010 | Sugimori ........... H04N 21/4113 348/241 |
| 2015/0124131 A1* | 5/2015 | Misawa ................ H04N 23/70 348/294 |
| 2016/0112646 A1 | 4/2016 | Tsunoda |
| 2022/0175245 A1* | 6/2022 | Soma ..................... H04N 9/646 |
| 2022/0254035 A1* | 8/2022 | Otsuka ................... G06V 10/94 |

FOREIGN PATENT DOCUMENTS

| | | |
|---|---|---|
| DE | 102013217240 A1 | 3/2014 |
| JP | H11275444 A | 10/1999 |

* cited by examiner

*Primary Examiner* — Kelly L Jerabek
(74) *Attorney, Agent, or Firm* — Schlee IP International, PC; Alexander R. Schlee; Pascal A. Schlee

(57) ABSTRACT

The invention relates to a digital viewing device, comprising at least one camera module, consisting of an objective (2) having a focal length fobj and an image sensor (3) having an image diagonal $d_{Sensor}$, and at least one electronic viewfinder, consisting of an eyepiece (9) having a focal length $f_{Oku}$, an image processor (5), a power supply (7) and an electronic display (10) having an image diagonal $y_{Display}$, characterised in that to correct distortion of the image generated on the display the image processor contains at least one computer program with distortion correction algorithms and the computer program can be switched on by means of an activating element (6).

9 Claims, 1 Drawing Sheet

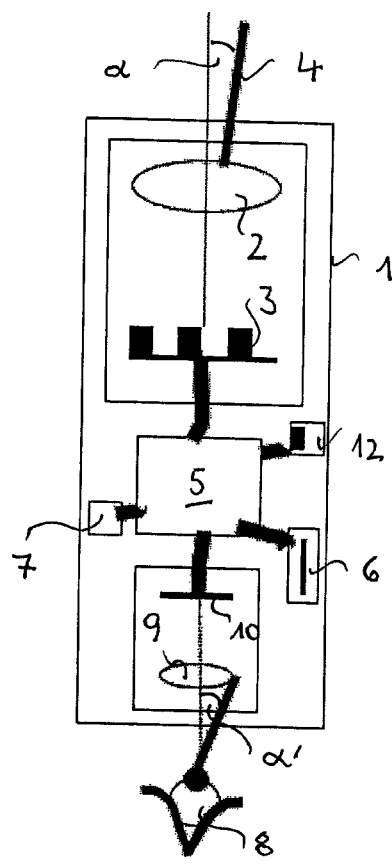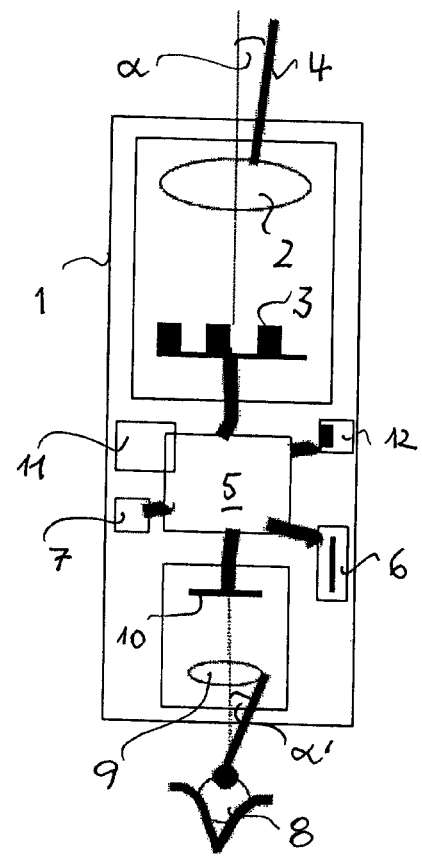
Fig. 1  Fig. 2
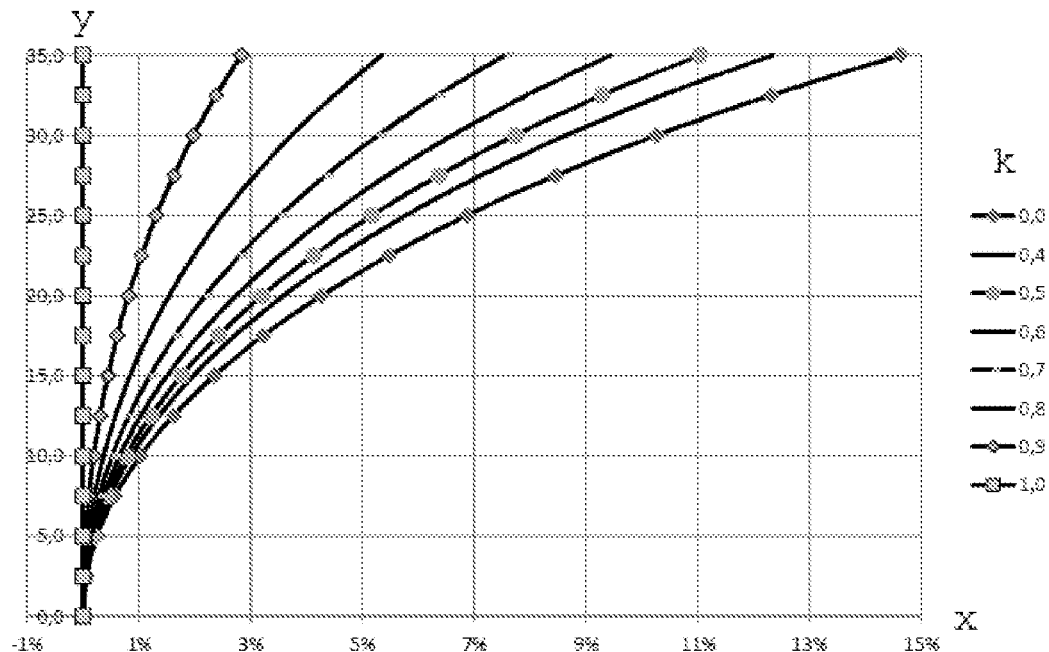
Fig. 3

DIGITAL VIEWING DEVICE

CROSS-REFERENCE TO RELATED APPLICATION

This application is a national phase entry under 35 USC 371 of the international patent application PCT/DE2020/100103 filed on Feb. 13, 2020 and published under the publication number WO 2021/160195 A1.

FIELD OF THE INVENTION

The invention relates to a digital observation apparatus, in particularly to a digital telescope.

BACKGROUND OF THE INVENTION

From the prior art reference US 2016/0-112646 A1 a photo camera apparatus is known including an image processing process for correcting the distortion of a zoom objective dependent on the focal length of the objective. In a wide angle space correlating to a short focal length a pincushion distortion occurs, and in telephotography correlating to a long focal length barrel distortion occurs, which distortions are corrected by correction parameters prestored in a computer so that independently of the zoom settings a distortion free image is created.

The general structure of a digital telescope is for instance known from the document DE 10 2013 217 240 A1. In this printed document a distance measuring device comprising a laser distance measuring component is described, comprising an objective lens projecting the image of a remote object onto an image sensor. The image sensor is coupled to a display generating a correlating displayed image that may be viewed by a user directly or by using an eyepiece.

When imaging remote objects through an objective and subsequently viewing through an eyepiece an image error in the form of distortion occurs, which is typically removed through optical correction calculations. In particular when panning the telescope the viewed image appears as if a globe runs with it. The image appears to run over a globe or a ball. For correcting this globe effect a certain image distortion needs to be provided, so that the lines at the edge of the image show curved.

The globe effect is known from observations with analog telescopes. It results from the human perception through the eye having a curvilinear retina and differs individually in its extent. It is dependent on the viewing angle $\alpha$ of the objective at which the objective is aligned to the center of the object field, the subjective viewing angle $\alpha'$ of the observer at which the human eye views, via the eyepiece, the image generated by the objective on the viewing field of the display, and magnification $\Gamma$ of the telescope as well as a distortion parameter of $0<k\leq1$.

Known analog telescopes are therefore typically provided with a predetermined distortion overcoming the globe effect or are provided with a low amount of distortion that makes the globe effect appear bearable.

SUMMARY OF THE INVENTION

It is an object of the invention to make the distortion correction adjustable or adaptable.

According to an aspect of the invention, this is achieved for the digital observation apparatus as discussed at the outset, for example digital telescope or digital binoculars, by a digital observation apparatus comprising: at least one camera module, comprising an objective with a focal length $f_{Obj}$ and an image sensor having an imaging diagonal measurement $d_{Sensor}$; and at least one electronic viewfinder, comprising an eyepiece having a focal length $f_{Oku}$, an image processor, a power supply and an electronic display having an imaging diagonal measurement $d_{Display}$; wherein the image processor comprises a computer program with a distortion-correction-algorithm for correcting a distortion on the image displayed on the display; and the computer program is activatable via an actuation element.

DETAILED DESCRIPTION OF THE INVENTION

The invention uses the image processor for a visual image displaying on the display. In the image processor, a distortion correction with at least one computer program including a distortion-correction-algorithm is integrated, which can be turned on and/or adjusted by an actuation element, preferably by an actuation element that is provided on the outside of the telescope. Accordingly, the user of the telescope can adapt the distortion according to the current use, for instance panning or viewing in a constant direction. The user may also make that adaption only one single time or infrequently, according to the user preferences. According to an alternative embodiment the actuation element is designed as a sensor, such as a motion sensor or an acceleration sensor, which effects an automatic setting of the computer program. Therefore, it is possible to keep the observation apparatus ready to use in its standby function, wherein lifting by the user activates the distortion correction. Likewise, it is possible to provide a rotary control switch having a continuously variable switch or a switch that can be set in discrete stages for setting the distortion correction so that the observation apparatus can be adjusted in an advantageous manner to the individual needs of the user or may be set upfront to so-called pre-sets.

It is possible to make a distinction between panning and viewing in a constant direction by means of the motion sensor or the acceleration sensor and therefore to correct for the distortion automatically. When viewing in a constant direction a lower or no distortion is set. If the user pans the telescope, for instance when the user scans a mountain range, the distortion can be adjusted continuously up to the point where no globe effect occurs.

In case of binocular telescopes or if at least two eyepieces or two electronic viewfinders are provided, the image processor needs to guarantee that both components are set so that the distortion corrections between both are identical.

For the manual adjustment as well as for the automatic adaption it is possible to prestore in the image processor profiles for several users and their respective preferred settings of the distortion correction, which profiles may be accessed swiftly via an additional switch or other actuation element. These profiles may be accessed either manually or automatically, for example via a fingerprint sensor or an eye sensor.

If images of the camera module are stored on a memory medium (e.g. an SD-card) the information about the set distortion may be stored together with the raw data or may be calculated into the JPG-data.

If videos are recorded the distortion setting may in parallel optionally be used or captured.

The distortion correction according to the invention is preferably applied in a digital telescope, digital binoculars, a microscope or an endoscope. Via a wireless communication interface, as for instance a wireless LAN, Bluetooth or Nearfield communication, settings may be transmitted or set and images or videos may be retrieved by a portable apparatus as e.g. a smart phone.

BRIEF DESCRIPTION OF THE DRAWINGS

Embodiments are shown schematically in the drawings and are described in the following. In the drawings show:
FIG. 1 digital telescope having a switch,
FIG. 2 digital telescope with a switch and a motion sensor, and
FIG. 3 a diagram showing curves for a variety of distortion parameters k.

DETAILED DESCRIPTION OF THE DRAWINGS

The telescopes shown in FIGS. 1 and 2 are monocular and are shown in a side view. The optical and electronic elements are mounted inside a housing 1.

The front module comprises an objective 2 having a focal length $f_{Obj}$ and an image sensor 3. The objective 2 captures the imaging beams 4 from the object space at a viewing angle α of the objective and images these onto the image sensor 3.

The signals captured by the image sensor 3 are transmitted to an image processor 5. Various operational modes of the image processor 5 can be turned on by an actuation element 6 that is accessible from a location outside of the housing 1.

The processor comprises an energy supply 7 that is likewise accessible from the outside. This may for example be a lockable battery compartment.

At the end of the housing 1 that is facing the observer having the eye 8 an eyepiece 9 having a focal length $f_{Oku}$ and a display 10 having an image height $y_{Display}$ are positioned. The display 10 is observed by the eye 8 under a subjective view angle α'.

According to the arrangement shown in FIG. 2, a motion sensor 11 is additionally provided and connected with the image processor 5. Based on signals from the image sensor 11 a variety of distortion corrections can be automatically adapted to the current operation of the telescopes.

Further, an image memory card (SD-card) 12 is connected to the image processor 5.

The distortion can generally depend on the view angle α of the objective, the distortion parameter k, and the magnification Γ and may be described by the following formula:

$$Dist(\alpha, k, \Gamma) = \frac{\tan\left(\frac{\arctan(\Gamma \cdot \tan(k \cdot \alpha))}{k}\right)}{\Gamma \cdot \tan(\alpha)} - 1$$

Herein, the magnification of the digital telescope Γ is calculated as follows:

$$\Gamma = \frac{f_{Obj}}{f_{Oku}} \cdot \frac{d_{Display}}{d_{Sensor}}$$

wherein $d_{Display}$ is the diagonal measurement of the screen and $d_{Sensor}$ is the diagonal measurement of the sensor.

As a good approximation, the distortion depends only on the subjective view angle α' and the distortion parameter k, not on the magnification Γ.

$$Dist(\alpha', k) = \frac{k \cdot \tan(\alpha')}{\tan(k \cdot \arctan(\tan(\alpha')))} - 1$$

For an eyepiece by which the image of the digital display is viewed the distortion can be calculated in a good approximation based on the focal length of the eyepiece $f_{Oku}$, the image height $y_{Display}$ of the display, as well as the distortion parameter k.

$$Dist(f_{Oku}, y_{Display}, k) = \frac{k \cdot \frac{y_{Display}}{f_{Oku}}}{\tan\left(k \cdot \arctan\left(\frac{y_{Display}}{f_{Oku}}\right)\right)} - 1$$

A non-corrected image point on the display at a distance $r_0$ from the middle of the display is displayed according to the invention at a distortion correction Dist at a distance of $r=r_0 \cdot (1+Dist)$ from the middle of the display.

In a practical implementation, several curves for k are stored as a table of values for k in the memory processor 5 (e.g. 0.0, 0.25, 0.5, 0.75 and 1.0) and can be provided by the processor 5 and the image can then be displayed on the display 10 at the calculated distortion.

As an alternative, as an approximation, the distortion can be calculated as a simple function of k and $$\frac{y_{Display}}{f_{Oku}}$$

and may then be calculated for example as $$Dist(f_{Oku}, y_{Display}, k) = coeff \cdot (1 - k^2) \cdot \left(\frac{y_{Display}}{f_{Oku}}\right)^2$$

For example, this correlation is sufficiently accurate at coeff=0.29 up to $$\frac{y_{Display}}{f_{Oku}} = 0.7,$$

which correlates to half of the subjective view angle α' of 35° of the eyepiece. Consequently, a total view angle of (2·α') of 70° results.

The distortion adjusted for the display 10 should always extend over the entire image area and should be oriented based on the entire shows and curved for avoiding unnatural image gradients.

The distortion of the optics of the objective may already be corrected by the processor 5 correlating to the sensor 3. If this is not the case the distortion correction as described above needs to be offset by calculation so that the image shown on the display comprises the desired distortion.

Also the distortion of the eyepiece optics needs to be offset by calculation with the above described distortion correction so that the image shown on the display 10 as viewed by the observer is observed at the desired distortion. A pre-stored table or an approximation function for the control of the distortion correction are then adapted accordingly.

If the focal length of the objective 2 is zoomable and consequently the magnification of the apparatus can be changed, this does in and of itself not have an influence on the above described distortion correction since it is independent of the magnification. Only an influence on the distortion of the optics of the objective based on the zoom is taken into consideration.

This is different if the focal length of the eyepiece 9 is zoomable and consequently the magnification of the apparatus can be varied. Since the distortion correction depends on the focal length of the eyepiece 9 a change for instance in the electronic scanning of a mechanical control curve, which is not further shown in the drawings, and its correlation to the set focal length is taken into consideration.

Since some observers also prefer a distortion correction while observing constantly in one direction for having a more natural viewing perception two values for the distortion parameter k may be provided, namely one for observing constantly in one direction and one for observing while panning. As an option, the user can also choose to set both values as identical values.

The diagram shown in FIG. 3 shows as an example curves for k=0.0001 through 1.0, wherein the distortion in % is provided on the X-axis and the values for arctan $$\left(\frac{y_{Display}}{f_{Oku}}\right)$$

are provided on the Y-axis. At the right edge of the curve curving parameters are shown for k=0.0 (top) through 1.0 (bottom). K=1.0 correlates to a curve extending along the y-axis. For k values approaching 0 curves result which extend from the origin of coordinates to a value of 35 along the y-axis trending progressively in direction of the 15% value on the x-axis.

The control options as described above are also of interest for additional apparatuses having an electronic viewfinder (EVF), for example for endoscopes or for microscopes. In case of endoscopes, viewing is often done by movement through an organ. In this case, it is helpful to avoid the globe effect. When during the examination geometries are measured and calculated, the distortion may be considered in the used measuring algorithm. Also in some applications for microscopes the globe effect is disturbing, for example when scanning an object.

LIST OF REFERENCE NUMERALS

1 housing
2 objective
3 image sensor
4 imaging beams at the objective
image processor
6 actuation element
7 power supply
8 eye
9 eyepiece
10 display
11 image sensor
12 memory card
α half of the viewing angle of the objective
α' half of the viewing angle of the observer
Γ magnification of the telescope
k distortion parameter

The invention claimed is:

1. A digital observation apparatus comprising:
at least one camera module, comprising an objective with a focal length $f_{Obj}$, said objective having an objective viewing angle α at which the objective is aligned to the center of an object field, and an image sensor having an imaging diagonal measurement $d_{Sensor}$; and
at least one electronic viewfinder, comprising an eyepiece having a focal length $f_{Oku}$, an image processor, a power supply and an electronic display having an imaging diagonal measurement $d_{Display}$ and a subjective viewing angle α' of an observer at which a human eye views, via the eyepiece, an image generated by the objective on the viewing field of the display; wherein
the image processor comprises a computer program with a distortion-correction-algorithm for correcting a distortion on the image displayed on the display; and
the computer program is activatable via an actuation element.

2. The digital observation apparatus of claim 1, wherein the distortion correction is continuously adjustable by the distortion-correction-algorithm via the actuation element.

3. The digital observation apparatus of claim 1, wherein the distortion correction is adjustable in discrete levels by the distortion-correction-algorithm via the actuation element.

4. The digital observation apparatus of claim 1, wherein a manual adjustment of the actuation element is provided, which is provided as an actuating element on the outside of a housing.

5. The digital observation apparatus of claim 1, wherein an automatic setting is provided for the actuation element.

6. The digital observation apparatus of claim 5, wherein a motion sensor is allocated to the image processor and the automatic adjustment is performed dependent on the signals from the motion sensor.

7. The digital observation apparatus of claim 6, wherein an image memory card is allocated to the image processor and the respective adjusted distortion corrections are storable separately.

8. The digital observation apparatus of claim 7, wherein the digital observation apparatus is selected from the group consisting of a digital telescope, digital binoculars, a microscope and an endoscope.

9. Digital telescope according to claim 8, wherein in case of binoculars the distortion correction is identical between the two binocular viewing paths.

* * * * *